July 20, 1937.   G. B. MOROSS   2,087,291
SELECTIVE AUTOMATIC SYNCHRONIZING APPARATUS
Filed July 25, 1933   3 Sheets-Sheet 1
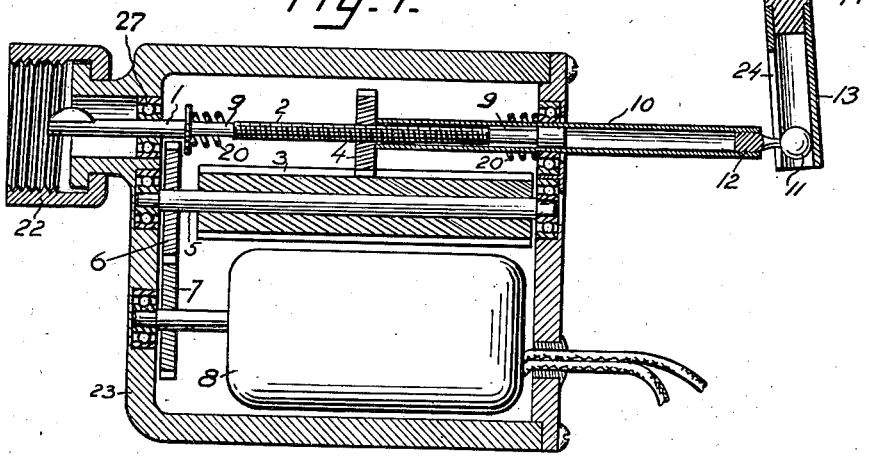
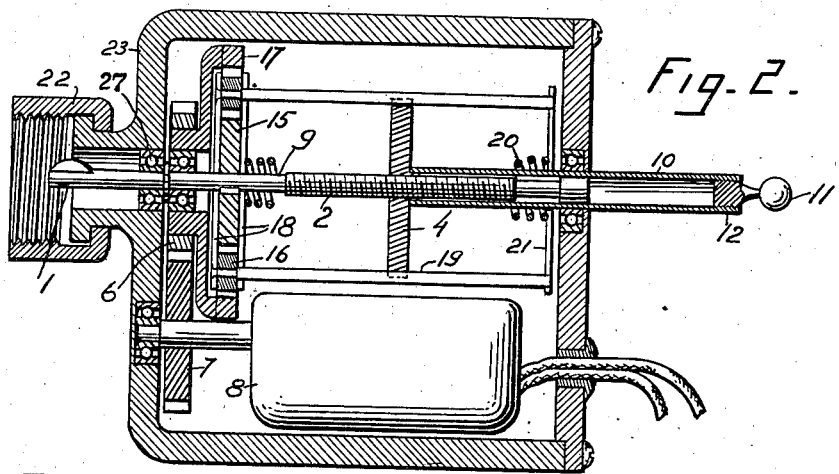
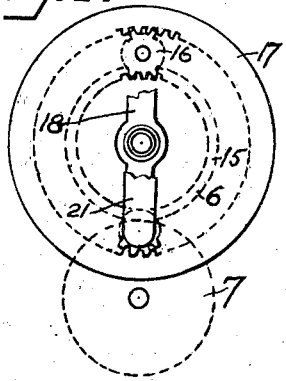
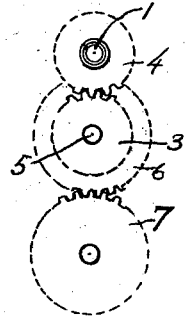
INVENTOR
GEORGE B. MOROSS.
BY *Arthur H. Serrell*
his ATTORNEY.

July 20, 1937.  G. B. MOROSS  2,087,291
SELECTIVE AUTOMATIC SYNCHRONIZING APPARATUS
Filed July 25, 1933  3 Sheets-Sheet 2
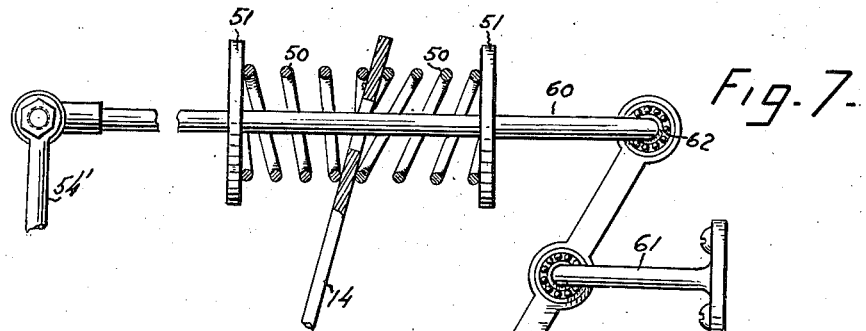
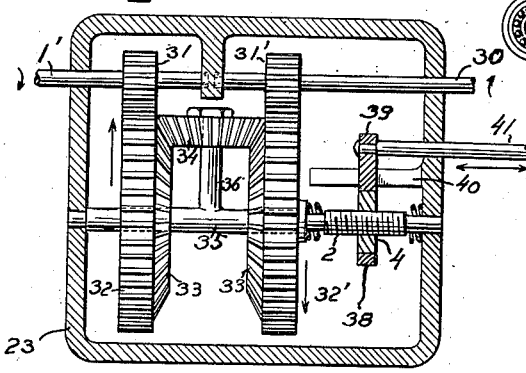
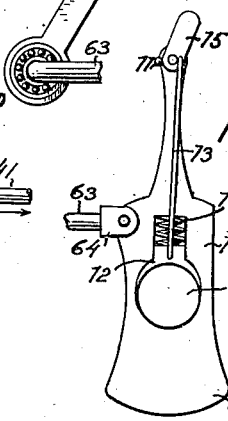
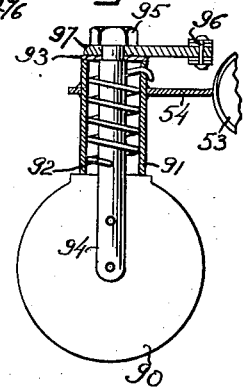
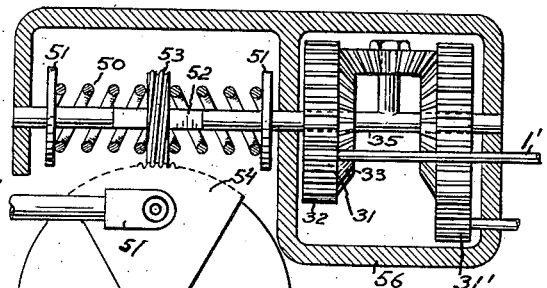
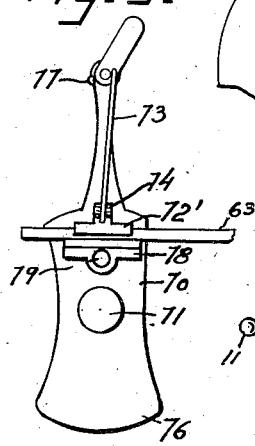
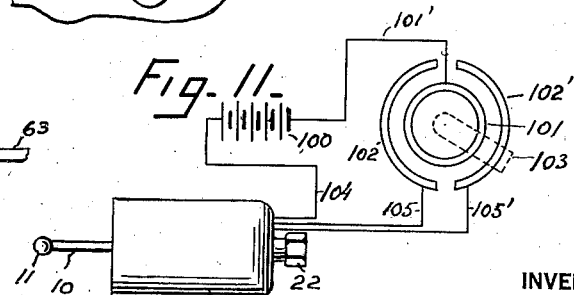
INVENTOR
GEORGE B. MOROSS.
BY Arthur H. Serrell
his ATTORNEY July 20, 1937.  G. B. MOROSS  2,087,291
SELECTIVE AUTOMATIC SYNCHRONIZING APPARATUS
Filed July 25, 1933  3 Sheets-Sheet 3
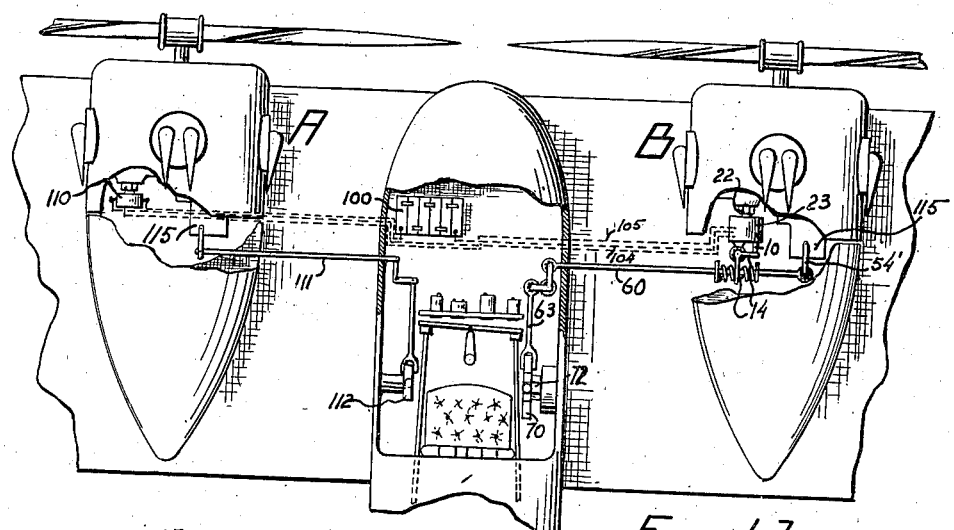
INVENTOR.
GEORGE B. MOROSS,
BY Arthur H. Serrell
his ATTORNEY Patented July 20, 1937

2,087,291

UNITED STATES PATENT OFFICE 2,087,291

SELECTIVE AUTOMATIC SYNCHRONIZING APPARATUS

George B. Moross, Woodside, N. Y.

Application July 25, 1933, Serial No. 682,093

5 Claims. (Cl. 60—97)

My invention relates to a selective automatic synchronizing apparatus for use, primarily, in facilitating simultaneous speed regulation of the engines of an airplane employing two or more prime movers.

The principal object of the invention is to provide a synchronizing apparatus of this character which automatically maintains the various engines of the airplane at synchronized speeds, to thereby substantially reduce vibration and eliminate unnecessary sound, and to produce this condition in such a way that the pilot, always has immediate direct control of the speed of any of the prime movers, without interference from the synchronizing apparatus, and is furthermore relieved from constantly watching for and correcting variation in the motor speeds, thereby allowing him more freedom of action in the avigation of the airplane.

Another object of the invention is to construct an apparatus for the selective automatic synchronization of airplane motors that embodies simple mechanical features throughout, is light in weight, efficient in operation, and furthermore will not interfere with the normal actions of a pilot in maneuvering the airplane.

A further object of the invention is to provide an apparatus of this character in which shifting of the carburetor arms, due to vibration, of the synchronized prime movers is effectively prevented. In accomplishing this feature of the invention, I have eliminated friction as far as possible throughout the individual throttle control systems and have concentrated this effect in a small brake which is placed in a position readily accessible to the pilot. A still further object is to provide a throttle controlling system for the synchronized engines in which there is no lost motion and which has been balanced for inertia reaction.

My invention further includes other objects, advantages and novel features of design, construction and arrangement, hereinafter more particularly referred to, in connection with the accompanying drawings in which Fig. 1 is a plan view and partial section of the synchronizing apparatus illustrating the embodiment of the invention in which a simple gear train is employed in connection with a synchronous electric motor.

Fig. 2 is a similar view of an alternative form of synchronizing mechanism in which I employ a planetary gear train.

Fig. 3 is a schematic illustration of the planetary gear train shown in Fig. 2.

Fig. 4 is a schematic illustration of the simple gear train employed in connection with synchronizing mechanism shown in Fig. 1.

Fig. 5 is a view in elevation and partial section showing a further modification of the synchronizing mechanism utilizing in this instance a differential gear train.

Fig. 6 is a similar view of a still further modification of the synchronizing mechanism based on the principle of a differential and in which the rotational motion therein is transmitted directly to the throttle of a carburetor.

Fig. 7 is a plan view of the lever system, associated with the synchronizing mechanism, through means of which the pilot may exert direct control upon the synchronized motor.

Fig. 8 is a view in elevation of the throttle handle which, in this instance, is permanently connected to the lever system.

Fig. 9 is a view in elevation showing an alternative form of throttle handle in which the lever system is not permanently connected thereto.

Fig. 10 is a plan view in part section showing a modification of the lever system such as to facilitate the incorporation of the resilient feature of the system in the body of the carburetor.

Fig. 11 is a diagrammatic view of the wiring system employed in connection with the forms of the invention including a synchronous motor such as is illustrated in Figs. 1 and 2.

Fig. 12 is a diagrammatic plan view of the preferred form of the invention showing the parts in assembled relationship in an airplane.

Fig. 13 is an elevation of a modified form of throttle handle, and

Fig. 14 is a plan view of the form of the invention shown in Fig. 10.

It will be understood that the forms of the invention in which a synchronous electric motor is employed, are primarily adaptable to instances where the motors of the airplane to be brought into synchronization are relatively distant from one another. In cases where the motors are relatively near, the form of synchronizer employing the differential principle, as shown in Fig. 5 or 6, is preferable. In order to simplify the description of the invention, an airplane employing only two motors will be considered. It will, however, be understood, that the invention contemplates and is adapted to facilitate the selective automatic synchronization of any number of prime movers that may be employed on an airplane. In the present instance one motor of an airplane, specified as "A", will be termed the primary motor, refer to Fig. 12, the speed of which determines, through means of the synchronizing apparatus, the speed of a termed secondary motor, which will be specified as "B".

With particular reference to Figs. 1 and 4 the reference numeral 1 indicates a shaft which is press fit in the ball bearing 27 and preferably directly connected or may be connected in any other well-known manner with the motor B, which is to be controlled through means of the synchronizing mechanism, at a speed the same as the speed of the primary motor A. The shaft 1 is screw threaded as indicated at 2 for a purpose hereinafter set forth. A gear 3 is connected, through shaft 5 and spur gears 6 and 7, to the shaft of a synchronous motor 8 which is driven at the speed of the primary motor A. A gear element 4, movable along the screw threaded shaft, between the limits determined by the springs 20 at opposite ends thereof, also meshes with the synchronously driven gear 3. The gear element 4, which I will hereinafter term a traveling nut, is fastened to a tube 10, which extends outside of the casing 23 that encloses the mechanism. The external end of the tube 10 is provided with a threaded plug 12 having a ball 11 operative in the slotted tube 13 at the end of the lever arm 14 which transmits the longitudinal or translational motion obtained from the synchronizing mechanism to the throttle valve of the carburetor of engine B. The tube 10 is slidably mounted in order to permit the same to move freely with the traveling nut 4. At the respective end portions of the shaft 1, within which the traveling nut may move, the thread is cleared as indicated at 9, so that the nut may rotate freely thereon without translational movement. The springs 20 tend to move the traveling nut back to a normal functioning position on the screw threaded portion 2 of the shaft 1. The shaft 1, and nut 4, rotate in the same direction. A nut 22 is employed for connecting the casing of the mechanism to the body of the engine B at a preferable point such as the tachometer outlet.

With reference to Fig. 11, I prefer to utilize an electric motor operating from a battery and rotating at synchronous speed with motor "A" to which the distributor element is fastened. Any type of motor such as a magnetic ratchet or synchronous motor may be utilized in this connection, and the specific construction of the same has no bearing on the present inventive disclosure. The electrical connecting wires to the motor are indicated in the drawings at 104, 105, and 105'. The battery of the hook-up is indicated at 100. The wires 105 and 105' are connected to segment rings of a distributor as indicated at 102 and 102'. The center ring of the distributor 101 is electrically connected to the other terminal of the battery 100 by means of the wire 101'. The distributor arm is shown at 103. The distributor comprising the elements 101, 102, 102' and 103 is designated in the drawings, Fig. 12, at 110. Utilizing this construction, with the rotation of the distributor arm 103, the shaft of the motor 8, Fig. 1, will rotate in synchronism with the airplane motor A to which the distributor element is fastened.

Referring to Figs. 2 and 3 a modification of the synchronizing mechanism of the apparatus is shown, in which I also employ a synchronous motor 8 which drives the shaft thereof in the same manner as that heretofore described in connection with Fig. 1 of the drawings. In this form of the invention I utilize a planetary gear train in which spur gear 15 is keyed to the shaft 1, the same meshing with pinions 16 which are arranged to freely rotate with the framework formed by rods 19 and connecting pieces 18 and 21. The pinions 16 also mesh with an internal ring gear 17 which is connected through its base with the gears 6 and 7. The shaft 1 and nut 4 rotate in the same direction. Parts corresponding in nature to that heretofore described in connection with Fig. 1 are designated by the same reference numeral in this embodiment of the invention.

With reference particularly to Fig. 5 of the drawings the synchronizing mechanism enclosed in the casing 23 includes shaft 1', which is preferably directly connected to the motor termed B to be synchronized. Shaft 30 is connected through any suitable means to the primary motor A of the airplane. Each of the shafts is provided with a pinion as indicated respectively at 31 and 31'. Spur and bevel gears respectively 32 and 33, secured together, are driven by pinion 31 and are free to rotate upon the shaft 35. Spur and bevel gears 32' and 33', corresponding to the same are driven in the opposite direction on shaft 35 by means of the pinion 31'. A bevel gear 34 meshing with gears 33 and 33' rotates freely upon a shaft 36 which extends perpendicularly from shaft 35. A portion of the shaft 35 is screw threaded as indicated at 2 to correspond in function with that shown designated by the same reference numeral in connection with the form of the invention shown in Figs. 1 and 2. The traveling nut 4 in this instance, is a press fit in the cover 38. The cover 38 has an extension piece 39 which moves between two parallel guides, one of which is indicated at 40, that extend from the interior of the casing wall 23. The rod 41, secured to the end of the extension piece 39, projects exteriorly of the casing wall in which it is slidably mounted, and is adapted to exert motion imparted to it, by means of the movement of the traveling nut during operation of the mechanism directly to the throttle of the carburetor of the engine B.

The form of the invention illustrated in Fig. 6 shows a modification of the embodiment thereof described in connection with Fig. 5, similar parts of the two forms being designated by the same reference numeral. In this instance the casing is indicated at 56, the same having an open section in proximity to the carburetor of the engine to be synchronized. The shaft 35 extends across the open section of the casing and on this portion thereof includes retainer elements 51. The portion of the shaft accommodating a worm 53, is square or splined as indicated at 52. Springs 50 operate to tend to maintain the worm gear in its mid-position on the shaft. The body of the carburetor is indicated at 55. A sector 54, having teeth meshing with the worm 53, transmits the motion thereof to the throttle valve of the carburetor. The arm 63' connects the sector 54 at clamp 57 to the lever system under the control of the pilot of the airplane.

With reference to Fig. 7, a portion of the leverage system, through which the pilot may control the throttle valve of the carburetor of the engine being synchronized, is illustrated. The system shown, therein, is preferably employed, in connection with the types of synchronizing mechanism illustrated in Figs. 1, 2, and 5 of the drawings. One of the rods of the lever system, designated at 60, is provided with retaining members 51, between which the springs 50, yieldingly engage the arm 14. The arm 54' is directly fastened to the throttle valve of the carburetor of engine B. The system, as shown, includes a rocker arm pivotally connected to a bracket 61 secured to the body of the airplane. The connections of the rods in the system are provided with ball bearings, as indicated at 62, to reduce the friction therein to a minimum. Rod 63 connects the system to the throttle handle, which is in a position in the cockpit of the airplane that is readily accessible to the pilot.

Referring to Fig. 8, the body of the throttle handle is indicated at 70. The handle is pivotally mounted on a shaft 71 which is fastened to the wall of the cockpit of the airplane. The friction of the leverage system is concentrated in the brake indicated at 72 in the handle. Rod 73 connects the brake 72 to the auxiliary, pivotally mounted, handle 75. A spring 74 normally maintains the brake in position on the shaft 71. A stop 77 is provided for the handle 75 against which it rests when the brake is disengaged. The clamp 64 permanently connects the rod 63 of the lever system of the body of the handle 70. The handle is also designed to have a heavy portion, below the shaft 71, as shown at 76, to counteract the inertia reaction of the leverage system. It is understood that this part could be easily designed in such a way, that the radius of gyration of body 70 could be changeable; as for instance, by a screw and a heavy nut placed radially therein, as shown at 76' in Fig. 13. With this arrangement, the system of levers is dynamically balanced.

Fig. 9 shows a modification of the throttle handle 70, in which the lever rod 63 is not permanently connected thereto. In this form of handle, a rocker support 78, pivotally mounted on shaft 79, is provided for the rod 63, upon which it may slide freely when the brake 72' is released. Parts, corresponding in function with that shown in the form of the invention illustrated in Fig. 8, are designated by the same reference numbers in these drawings.

Referring to Fig. 10 and Fig. 14, a further modification of the lever system is shown, that may be employed in connection with the form of the invention shown in Fig. 6. With the present construction the worm indicated at 53 is rigidly fastened to the shaft 35, (refer to Fig. 6) and the springs 50 are eliminated. The gate valve of the carburetor is indicated at 90 in the drawings, Fig. 10, which is secured through its stem 94 to a lever arm 97 by means of the nut 95. The arm is pivotally connected to rod 63' as shown at 96, the rod being under the direct control of the pilot at all times through the throttle handle 70. The sector 54, meshing with the worm gear, is rigidly connected to a tubular member 91. A spring 92, has one end fastened to the stem 94 and the other secured in the wall of the tubing 91. A washer 93 loosely separates the tubing and the arm 97. In this particular construction, it will be understood that, if a frictional, instead of resilient, means for operation is desired, the nut 95 may be tightened, so that friction between the washer 93 and tubing 91 is sufficient for operating the same. In Fig. 12, the lever system indicated at 111 and the throttle handle at 112 are constructed in accordance with the usual airplane practice to enable the pilot to manually exert control, through means of the carburetor over the speed of the motor "A". The friction in this system prevents the shifting of the same due to inertia reaction and consequently it does not require balancing. The carburetors for the engines are designated at 115, Fig. 12.

The method of operation of the apparatus shown in the form of the invention in Figs. 1, 7 and 8 of the drawings is as follows. The pilot, refer to Fig. 12, operates motor A of the airplane in the usual manner through lever system 111 and handle 112, and releases the brake 72 of the throttle handle 70, which controls communication to the carburetor of motor B, by moving the lever 75 against the stop 77. The synchronous motor 8 operates at the same speed as the motor A, and the shaft 1 rotates at the speed communicated to it by the motor B. When the speeds of the motors are the same, the traveling nut rotates, with the screw threaded portion 2 of the shaft 1, with the same velocity as the gear 3, which is driven by the synchronous motor, so that there is no longitudinal, or translational movement of the nut along the shaft 1. However, in the event that the speed of motor B is not the same as that of A, the traveling nut 4 rotates on the screw 2 and will move longitudinally along the screw thread, and automatically, through means of the tube 10 and lever 14, which are connected, through the resilient lever system, to the throttle valve by way of arm 54', adjusts the same to bring the motor into synchronism with motor A. In the event of the failure of motor A to function properly, or to come to a complete stop, the pilot, by utilizing the friction in the brake mechanism at the hand throttle, may manually, by this means, through the lever system, exert direct control over the throttle valve of the carburetor of the engine B and regulate and set its speed without interference from the synchronizing mechanism. The traveling nut 4, in this instance, moves to an idling position off the screw thread and against the spring 20 at the left-hand side of the drawings, and the lever arm 14 compresses the comparatively weak spring 50 without affecting the position of the lever system.

The operation of the embodiment of the invention, shown in Fig. 2, is substantially the same, with the exception that the rotary longitudinal, or translational, motion is imparted to the lever system by means of a planetary gear train. This is accomplished by variance in rotary motion between the pinion 15, mounted in shaft 1, and the gear 17, which rotates at the speed of the synchronous motor 8, which imparts motion to the pinions 16, that in turn move the framework, or cage, 19, so that the traveling nut adjusts the tube 10 to regulate the carburetor of the motor B and bring it to synchronous speed with motor A.

The operation of the form of the invention shown in Fig. 5 is as follows. Bevel gear 33 is driven by gears 32 and 31 at the speed imparted to it by the engine B through the shaft 1'. The engine A drives the bevel gear 33' at synchronous speed in the opposite direction by means of the gears 32' and 31'. The respective bevel gears, which are free to rotate upon the shaft 35, impart motion to the same, through the bevel gear 34, when there is any difference between the engine speeds. This movement, in turn, is transmitted to the longitudinally movable arm 41 through the medium of the traveling nut 4, so that the throttle valve of engine B adjusts the same to either bring it up to, or down to, synchronous speed with motor A.

In relation to Fig. 6, the movement of the shaft 35, transmitted to it through a gear train mechanism, as described in connection with Fig. 5, is transmitted to the worm 53. This directly moves the sector 54, of the carburetor, to adjust the throttle valve in a manner to bring the motors into synchronism. In the event that either of the engines is incapaciated, the pilot may exert direct control to the throttle of engine B, in this instance, through the rod 63' from either of the types of hand throttles, the worm 53 compressing the spring 59 and moving off upon the rounded part of the shaft 35.

The operation of the form of the invention shown in Figs. 10 and 14 is as follows. In the normal case, in which the pilot has released the brake on the throttle handle, the rod 63 from the same may move freely with the arm 97, through which the check valve of the carburetor may be manually regulated. The movement of the throttle valve, through means of the synchronizing mechanism is accomplished in the following way. The worm 53 moves the tubing 91 through the sector 54, which in turn, by means of the spring 92, adjusts the position of the valve stem 94, to bring the motors into synchronism.

Various modifications may be made in the structure of the apparatus operating in accordance with the principle of my invention, without departing from the nature and spirit thereof such as indicated in the accompanying claims.

I claim as my invention:

1. A synchronizing apparatus for airplane motors adapted to accomplish the unitary result of allowing the pilot flexible control over each of the motors in case of necessity, having in combination, a speed differentiating mechanism for synchronizing the operation of the individual motors, said mechanism imparting regulatory rotary motion, a shaft adapted to receive said motion, a worm, situated upon the shaft, being freely movable thereon in a longitudinal direction, a pivotally arranged sector having a portion meshing with the worm, communicating with the throttle valve of the motor being synchronized, and a lever system connected to the said sector through which, by the movement of the worm in a longitudinal direction, direct manual control of the throttle valve of the motor being synchronized may be exercised by the pilot.

2. In a synchronizing apparatus for airplane motors, the combination of a mechanism operative to continuously tend to bring one of the motors into synchronism with another motor, a lever system, associated therewith, communicating with the throttle valve of the motor tending to be synchronized, hand operable means for the pilot included in said system, and means for flexibly connecting the synchronizing mechanism with said lever system, so that the speed of the motor, tending to be synchronized, may be maintained either above or below the speed of the other motor by the pilot through said hand operable means.

3. In a synchronizing apparatus for airplane motors adapted to accomplish the unitary result of allowing the pilot flexible control over each of the motors in case of necessity, the combination of a mechanism operative to continuously tend to bring one of the motors into synchronism with another motor, a lever system, associated therewith, communicating with the throttle valve of the motor tending to be synchronized, a hand throttle for the pilot included in said system, and means for yieldingly connecting the synchronizing mechanism with said lever system, so that the speed of the motor, tending to be synchronized, may be maintained either above or below the speed of the other motor by the pilot at the hand throttle.

4. A synchronizing apparatus for airplane motors adapted to accomplish the unitary result of allowing the pilot flexible control over each of the motors in case of necessity, having in combination, a mechanism operative to continuously tend to bring one of the motors into synchronism with another motor, a lever system, associated therewith, having a normally released brake, said system communicating with the throttle valve of the motor tending to be synchronized, a hand throttle for the pilot at the brake portion of said system, and means for yieldingly connecting the synchronizing mechanism with said system, so that the speed of the motor, tending to be synchronized, may be maintained either above or below the speed of the other motor by the pilot through the brake at the hand throttle.

5. A synchronizing apparatus for airplane motors adapted to accomplish the unitary result of allowing the pilot flexible control over each of the motors in case of necessity, including a continuously operable speed differentiating mechanism capable of regulatory movement, a balanced lever system communicating with the throttle valve of the motor tending to be synchronized, a pivotal hand throttle for the pilot included in said lever system, an arm for communicating the regulatory movement of the speed differentiating mechanism to the lever system, said arm being connected to the lever system between two yieldable springs mounted thereon, thereby permitting manual regulation of the motor, tending to be synchronized, so that the speed of the same may be maintained either above or below the speed of the other motor through the influence of the pilot at the hand throttle.

GEORGE B. MOROSS.